United States Patent [19]

Stapp

[11] Patent Number: 4,572,292

[45] Date of Patent: Feb. 25, 1986

[54] ENHANCED OIL RECOVERY

[75] Inventor: Paul R. Stapp, Bartlesville, Okla.

[73] Assignee: Phillips Petroleum Company, Bartlesville, Okla.

[21] Appl. No.: 596,869

[22] Filed: Apr. 4, 1984

[51] Int. Cl.[4] .............................................. E21B 43/16

[52] U.S. Cl. .................................. 166/274; 166/273; 166/275

[58] Field of Search ....................... 166/273, 274, 275

[56] References Cited

U.S. PATENT DOCUMENTS

| | | | |
|---|---|---|---|
| 3,757,861 | 9/1973 | Routson | 166/273 |
| 4,146,499 | 3/1979 | Rosano | 166/274 |
| 4,472,291 | 9/1984 | Rosano | 166/274 |

*Primary Examiner*—Stephen J. Novosad
*Assistant Examiner*—Bruce M. Kisliuk
*Attorney, Agent, or Firm*—Howard D. Doescher

[57] ABSTRACT

A well composition and waterflood process comprising the use of an aqueous solution containing a small effective amount of an inorganic peroxide, such as hydrogen peroxide, and a fatty amine oxide followed by an aqueous drive fluid.

6 Claims, No Drawings

ENHANCED OIL RECOVERY

BACKGROUND OF THE INVENTION

This invention relates to well fluids and to the recovery of oil from oil-bearing earth formations. In accordance with one aspect, this invention relates to post primary oil recovery of such formations. In accordance with another aspect, this invention relates to the use of well fluids comprising water containing hydrogen peroxide and at least one fatty amine oxide as a secondary recovery method during waterflooding, as a tertiary recovery method after waterflooding, or after a polymer or surfactant flood. In another aspect, this invention relates to the recovery of hydrocarbons from subterranean formations by injection of aqueous solutions containing hydrogen peroxide and at least one fatty amine oxide.

In waterflooding oil-bearing earth formations, water is injected down an input well and into the formation. The water displaces oil from the formation toward a producing well through which the oil is recovered. Many additives have been proposed for use in the water to improve oil recovery. Some of these work well in specific formations. The characteristic of the operation of additives in flooding water, however, has been that although certain additives might improve oil recovery from some reservoirs, these same additives did not improve recovery from other formations. The present invention is directed to the utilization of aqueous compositions in post primary oil recovery operations leading to enhanced recovery of oil from an oil-bearing earth formation.

Accordingly, an object of this invention is to provide an additive system for use with well fluids to improve oil recovery.

Another object of this invention is to provide a method for recovering oil from a permeable solid material which is contacted with an aqueous system containing additives for enhanced oil recovery.

Other objects, aspects, as well as the several advantages of the invention will be apparent to those skilled in the art upon reading the specification and the appended claims.

SUMMARY OF THE INVENTION

In accordance with the invention, well fluids comprising water, hydrogen peroxide, and at least one fatty amine oxide are provided which fluids are useful in the recovery of oil from oil-bearing earth formations.

In one embodiment, a method is provided for recovering oil from a subterrean formation containing oil by injecting into the formation an aqueous solution containing peroxide and at least one fatty amine oxide.

Thus, the invention comprises the use of a mixture of at least one amine oxide and at least one inorganic peroxide as a secondary recovery additive during waterflooding, as a tertiary recovery method after waterflooding, and as a recovery method after polymer or surfactantflooding. It is also within the scope of the invention to use alcohols, such as isopropanol and isobutanol, in compositions containing amine oxides and inorganic peroxides. It is further within the scope of the invention to use the compositions of the invention for offshore recovery since the amine oxides are unaffected by polyvalent metal ions that could be present in sea water.

DETAILED DESCRIPTION OF INVENTION

The well fluids of the invention can be injected into a formation during waterflooding or following waterflooding or other post primary methods of recovery and the drive fluid, such as fresh water, can be injected following the composition of the invention to produce oil from the formation.

The aqueous compositions of the invention can comprise brine solutions containing hydrogen peroxide and at least one fatty amine oxide as well as alcohols and other additives.

As used herein, the term "brine" is intended to include any aqueous solution of mineral salts having greater than 1,000 ppm solid content such as are frequently present in oil fields. Oil field brines commonly contain varying amounts of sodium chloride, calcium chloride or magnesium salt. Also flooding solutions are frequently modified by the addition of potassium chloride to stabilize the subsurface clay. Moreover, potassium chloride is also frequently encountered. The practical application, such as the post primary petroleum recovery operation, the naturally occurring brine which is encountered, will be predominantly sodium chloride or potassium chloride but a great number of other salts are always present.

The aqueous medium in the present invention preferably is hard brine comprising on the order of 1,000 to 15,000 ppm divalent cations such as preferably $Ca^{++}$ with a total dissolved solid (TDS) in the range of about 100,000 to about 300,000 ppm. It is contemplated that the inventive composition would be applicable in areas characterized by the availability of highly saline field waters.

The amounts of peroxide and amine oxide present in the aqueous compositions of the invention will be small effective amounts which are sufficient to provide enhanced oil recovery. Generally, the aqueous solutions of the invention contain from 0.01 to about 10 weight percent of an inorganic peroxide, such as hydrogen peroxide, and from 0.01 to about 10 weight percent of amine oxide. The weight ratio of peroxide to amine oxide ordinarily ranges from about 5:1 to about 1:5, with a preferred weight ratio of about 1:1.

The fatty amine or trihydrocarbyl amine oxides of the invention can be represented by the formula $R_3N \rightarrow O$ wherein R is a hydrocarbyl group with the proviso that one hydrocarbyl group has from about 8 to about 18 carbon atoms and the total number of carbons in all R groups does not exceed about 24 carbon atoms. Suitable hydrocarbyl groups include alkyl, cycloalkyl, aryl, alkaryl, aralkyl, and the like.

Representative examples of suitable amine oxides that can be used include:

N,N-dimethyloctylamine N-oxide,
N,N-diethyldecylamine N-oxide,
N,N-dibutyldodecylamine N-oxide,
N,N-dimethylhexadecylamine N-oxide,
N,N-diethylhexadecylamine N-oxide,
N,N-dibutylhexadecylamine N-oxide, and the like, and mixtures thereof.

Commercially available amine oxides can be used in the compositions of the invention as well as the amine oxides mentioned above.

In carrying out the invention in actual practice, an aqueous solution containing an inorganic peroxide, such as hydrogen peroxide, and at least one fatty amine oxide is pumped into one or more injection wells and out into the oil bearing formation until an amount of the solution has been injected which will enhance recovery of oil present in the formation. After introduction of the peroxide and amine oxide, sufficient pressure can be applied through the injection well to push the solution into the formation and maintain same therein for a period of time sufficient to cause oil to be produced through a production well. The injected slug of peroxide and amine oxide can be followed by a flood of fresh or saline water to drive oil to the production well.

The following examples illustrate the invention but are not to be construed as limiting the same.

EXAMPLE I

This example describes the oil recovery from a waterwet Berea sandstone core with the inventive oil recovery system containing aqueous hydrogen peroxide (0.1 weight percent of the injected slug) and fatty amine oxide (0.08 weight percent of the injected slug). The run was carried out at 1.0 weight percent NaCl based on the injected slug.

The following experimental procedure was used to condition a waterwet Berea sandstone core for a run to demonstrate the effectiveness of the inventive $H_2O_2$/amine oxide system in tertiary oil recovery.

EXPERIMENTAL

General

Berea sandstone cores measuring approximately 3 feet in length and 3 inches in diameter were dried under vacuum for 24 hours at 250° F. Polycarbonate disc end plates with centrally located ⅛" threaded openings were secured to each end of the core with epoxy adhesive before applying an epoxy coating to the outside surface of the core. The epoxy coating material was formulated by mixing 550 g of a commercially available epoxy resin, 50 g of a suitable activator and 140 g diatomaceous earth. This mixture was stirred until smooth before applying to the surface of the core. The cores were rotated continuously as the epoxy mixture was applied with a 2" paint brush. Four gauze strips measuring 2"×12" were applied to the core in the following manner: a first gauze strip was applied to the core and covered with epoxy as the core was rotated; the remaining three strips were then individually incorporated in a similar manner. The core coating was cured over a period of about 4 hours at ambient temperature as the core was rotated. One-eighth inch male connector fittings were placed on each end of the core and pipe plug caps were put on the core.

The core was weighed to determine the dry weight before being saturated with brine of the desired concentration. A vacuum of about 1 mm was pulled on the core before saturating the core with approximately 500 mL of brine. After saturation, approximately 100 to 200 mL of brine were pumped through the core before determining the original permeability to water. A 1 mL portion of effluent brine was collected from the saturated core and thereafter during a period of one minute, the volume of additional effluent collected and the pressure in psi were recorded. With these values the original permeability to water, e.g., on the order of 3.2 mL/min at 43 psi could be recorded. The pore volume of the core was calculated by the relationship:

$$\frac{\text{Brine-Saturated Core Wt (g)} - \text{Dry Core Wt (g)}}{\text{Brine Density (g/mL)}} =$$

-continued $$\text{Core Pore Volume (mL)}$$

The brine-saturated core was oilflooded in the conventional manner until oil break-through became detectable by the presence of alternate globules of oil and water in the effluent line. The oilflood was carried out to completion by the 24 hour recycling of oil through the core to remove all of the displaceable water. The total water displaced, i.e., water displaced at the point of oil break-through and water displaced by the 24 hour recycle procedure was recorded as water displaced by oilflood. If desired, oil permeability was determined in a manner analogous to that used above for establishing original permeability to water. Prior to waterflood, the effluent line was air blown to remove oil.

The oilflooded core was waterflooded in the conventional manner until water break-through became detectable by the presence of alternate globules of oil and water in the effluent line. The waterflood was carried to completion by the 24 hour recycling of water through the core to remove all of the displaceable oil. The total oil displaced, i.e., oil displaced at the point of water break-through and oil displaced by the 24 hour recycle procedure was recorded as oil displaced by waterflood. If desired, water permeability after waterflood can be determined in a manner analogous to that used above for original permeability to water. The residual oil volume remaining in the core was calculated by subtracting the oil volume displaced by the waterflood from the water volume displaced by the oilflood. At this point, the core simulated an oil reservoir which had been exhaustively waterflooded. Cores were routinely conditioned in this manner prior to carrying out oil recovery tests.

Control runs were carried out by injecting aqueous hydrogen perixode alone and by injecting aqueous amine oxide alone. The results are summarized in Table I.

TABLE I

| Run No. | Type of Run | % Tertiary Oil Recovery | Approximate Pore Volumes Pumped Through Core |
|---|---|---|---|
| 1 | Control[a] | 11.7 | 20.5 |
| 2 | Control[b] | 0.0 | 7.6 |
| 3 | Invention[c] | 35.3 | 28.4 |

[a]The injection system was prepared by mixing 10 g NaCl, 3.3 g of 30 weight percent $H_2O_2$ and 986.7 g Arkansas-Burbank water (<500 ppm total dissolved solids).
[b]The injection system was prepared by mixing 10 g NaCl, 2.0 g Aromox ® DMC-W (a 50 percent active aqueous solution of N,N—dimethylhexadecylamine N—oxide) and 988 g Arkansas-Burbank water.
[c]The injection system was prepared by mixing 10 g NaCl, 2.0 g Aromox ® DMC-W (a 50 percent active aqueous solution of N,N—dimethylhexadecylamine N—oxide), 3.3 g of 30 weight percent $H_2O_2$ and 984.7 g Arkansas-Burbankwater.

Referring to Table I, it is evident that the combination of hydrogen peroxide and amine oxide in very small quantities gives a surprisingly good oil recovery (35.3% TOR) compared to either component alone. Apparently, there is some unexpected interaction between $H_2O_2$ and amine oxide which significantly improved the oil recovery from a Berea sandstone core.

I claim:

1. A method for recovering fluid hydrocarbons from a subterranean oil-bearing formation which is penetrated by a well and at least one production well which comprises injecting into said formation through said injection well an aqueous solution consisting essentially of water, an inorganic peroxide, and at least one fatty amine oxide, thereafter injecting into the formation an aqueous drive fluid, and producing oil from said formation through said production well.

2. A process according to claim 1 wherein said aqueous drive fluid is a brine.

3. A process according to claim 1 wherein the amount of each of peroxide and amine oxide present ranges from 0.01 to about 10 weight percent based on total aqueous solution and the weight ratio of peroxide to amine oxide ranges from about 5:1 to about 1:5.

4. A process according to claim 3 wherein the weight ratio is about 1:1.

5. A process according to claim 1 wherein said amine oxide has the formula $R_3N \rightarrow O$ wherein R is a hydrocarbyl group with the proviso that one hydrocarbyl group has from about 8 to about 18 carbon atoms and the total number of carbons on all R groups does not exceed about 24 carbon atoms.

6. A process according to claim 5 wherein said amine oxide is N,N,-dimethylhexadecylamine-N-oxide and said peroxide is hydrogen.

* * * * *

UNITED STATES PATENT AND TRADEMARK OFFICE
CERTIFICATE OF CORRECTION

PATENT NO. : 4,572,292

DATED : February 25, 1986

INVENTOR(S) : PAUL R. STAPP

It is certified that error appears in the above-identified patent and that said Letters Patent is hereby corrected as shown below:

Column 6, line 11, after "hydrogen" insert ---peroxide---.

Signed and Sealed this

*Twenty-seventh* Day of *May 1986*

[SEAL]

*Attest:*

DONALD J. QUIGG

*Attesting Officer* *Commissioner of Patents and Trademarks*